United States Patent
Droz

(10) Patent No.: US 10,377,374 B1
(45) Date of Patent: *Aug. 13, 2019

(54) DETECTION OF PEDESTRIAN USING RADIO DEVICES

(71) Applicant: Waymo LLC, Mountain View, CA (US)

(72) Inventor: Pierre-yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 15/154,366

(22) Filed: May 13, 2016

Related U.S. Application Data

(63) Continuation of application No. 14/073,335, filed on Nov. 6, 2013, now abandoned.

(51) Int. Cl.
*B60W 30/09* (2012.01)
*G05D 1/00* (2006.01)
*H04W 84/12* (2009.01)

(52) U.S. Cl.
CPC ........... *B60W 30/09* (2013.01); *G05D 1/0088* (2013.01); *H04W 84/12* (2013.01)

(58) Field of Classification Search
CPC ....... B60W 30/09; G05D 1/0088; G05D 1/16; G05D 1/163; G05D 1/164; G05D 1/166; B60R 21/00; H04W 84/12
USPC .......................................... 701/23, 300, 301
See application file for complete search history.

(56) References Cited

U.S. PATENT DOCUMENTS

| | | | | |
|---|---|---|---|---|
| 6,292,753 B1 * | 9/2001 | Sugimoto | ................. | B60T 7/22 340/435 |
| 6,313,758 B1 * | 11/2001 | Kobayashi | ............. | G08G 1/162 340/436 |
| 6,343,247 B2 * | 1/2002 | Jitsukata | ................. | G01C 21/26 180/168 |
| 7,966,128 B2 * | 6/2011 | Widodo | ............. | G01C 21/3644 340/995.24 |
| 8,170,788 B2 * | 5/2012 | Sjogren | ................. | G08G 1/167 701/23 |

(Continued)

FOREIGN PATENT DOCUMENTS

EP 1531444 A2 * 5/2005 ............. G08G 1/161

*Primary Examiner* — Angelina Shudy
(74) *Attorney, Agent, or Firm* — McDonnell Boehnene Hulbert & Berghoff LLP

(57) ABSTRACT

The present radio system transmits an electromagnetic signal to nearby devices requesting the device respond. The radio system also receives responses to the electromagnetic signal from the nearby devices. Based on the radio technology used, the signaling of the transmitted electromagnetic signal may be varied. For example, the transmitted electromagnetic signal may be a Bluetooth, 802.11, or other radio signal. A device that received the signal from the radio unit may transmit a response signal with the same radio technology. However, in some instances, the radio technology used for communication may operate on several radio (e.g., frequency) channels. Both the transmitter and receiver must operate on the same channel at the same time in order to communicate. Thus, it may be desirable to transmit the electromagnetic signal on more than one channel at the same time, in order to increase the chances that a nearby device responds.

14 Claims, 7 Drawing Sheets

(56) References Cited

U.S. PATENT DOCUMENTS

| | | | | |
|---|---|---|---|---|
| 8,295,851 B2* | 10/2012 | Finnegan | H04W 4/21 | 455/456.1 |
| 8,340,893 B2* | 12/2012 | Yamaguchi | G08G 1/163 | 701/301 |
| 8,369,782 B1* | 2/2013 | Lin | H04B 7/2612 | 455/161.1 |
| 9,037,404 B2* | 5/2015 | Ibrahim | G05D 1/0055 | 701/446 |
| 9,204,251 B1* | 12/2015 | Mendelson | G08G 1/14 | |
| 9,204,257 B1* | 12/2015 | Mendelson | G08G 1/14 | |
| 2005/0073438 A1* | 4/2005 | Rodgers | G08G 1/166 | 340/944 |
| 2006/0204050 A1* | 9/2006 | Takizawa | G06K 9/00288 | 382/115 |
| 2006/0224300 A1* | 10/2006 | Shioya | G08G 1/164 | 701/532 |
| 2007/0032240 A1* | 2/2007 | Finnegan | H04W 4/21 | 455/445 |
| 2008/0018494 A1* | 1/2008 | Waite | H05B 33/0803 | 340/907 |
| 2009/0248231 A1* | 10/2009 | Kamiya | G05D 1/0061 | 701/23 |
| 2009/0307091 A1* | 12/2009 | Lilley | G06Q 30/02 | 705/14.58 |
| 2011/0001635 A1* | 1/2011 | Akens | G08G 1/04 | 340/936 |
| 2011/0199199 A1* | 8/2011 | Perkins | B60Q 1/506 | 340/435 |
| 2011/0210866 A1* | 9/2011 | David | G08G 1/166 | 340/903 |
| 2012/0064855 A1* | 3/2012 | Mendelson | G01C 21/206 | 455/404.2 |
| 2013/0151135 A1* | 6/2013 | Aubrey | G08G 1/0116 | 701/118 |
| 2014/0005874 A1* | 1/2014 | Brommer | G08G 9/02 | 701/23 |
| 2014/0309833 A1* | 10/2014 | Ferguson | G05D 1/00 | 701/23 |
| 2015/0035685 A1* | 2/2015 | Strickland | B60Q 9/008 | 340/901 |
| 2015/0205298 A1* | 7/2015 | Stoschek | G05D 1/021 | 701/23 |
| 2015/0339912 A1* | 11/2015 | Farrand | G08B 25/00 | 340/501 |
| 2016/0049079 A1* | 2/2016 | Ibrahim | G08G 1/166 | 340/944 |
| 2016/0071418 A1* | 3/2016 | Oshida | G08G 1/22 | 701/23 |
| 2016/0209840 A1* | 7/2016 | Kim | G05D 1/0061 | |

* cited by examiner

DETECTION OF PEDESTRIAN USING RADIO DEVICES

CROSS REFERENCE TO RELATED APPLICATION

The present application claims priority to U.S. patent application Ser. No. 14/073,335 filed on Nov. 6, 2013, the entire contents of which is herein incorporated by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

Many pedestrians carry wireless devices in their pockets. These wireless devices may be able to receive and transmit radio signals. Radio signals transmitted by the wireless device may be communicated to either a wireless base station (e.g., a cellular base station, 802.11 base station, or other base station) or another wireless device. An autonomous car and/or other types of autonomous vehicles may be able to receive radio signals transmitted by wireless devices that are carried by pedestrians. By detecting signals that are emitted by a pedestrian's mobile device, an autonomous car may be able to detect the location of pedestrians. In some cases, the radio signals transmitted by the wireless device may be encoded in a way the vehicle is unable decode. However, the simple presence of such a radio signal may be sufficient to locate a pedestrian in possession of the emitting device, even when the autonomous car is unable to decode the radio signal. Further, in some embodiments, the vehicle may transmit signals in order to evoke a responsive signal from the wireless device. For example, an autonomous vehicle could transmit a Bluetooth discovery signal to get a response from wireless devices. Other examples are possible.

An apparatus disclosed herein includes a sensor unit. The sensor unit may be configured to transmit a device-discovery radio signal. The device-discovery radio signal may include a request for any nearby device to transmit a responsive radio signal. The device-discovery radio signal may be transmitted on more than one channel of a radio spectrum associate with the radio signal at the same time. The sensor unit may be further configured to receive, in response to the device-discovery radio signal, a responsive radio signal. The apparatus may also include a processing unit. The processing unit may be configured to analyze the responsive radio signal to determine that the responsive radio signal is associated with a pedestrian. The processing unit may be further configured to alter the control of the apparatus based on the presence of the pedestrian based on the received radio signal being associated with a pedestrian.

Methods disclosed herein include transmitting a discovery radio signal, where the discovery radio signal will cause nearby devices to transmit a response radio signal. Additionally, the discovery radio signal may be transmitted on more than one channel of a radio spectrum associate with the radio signal at the same time. The method also includes receiving a response radio signal and analyzing the response radio signal to determine if the radio signal is associated with a pedestrian. Based on the received radio signal being associated with a pedestrian, the method may alter the control of the apparatus by a control system based on the presence of the pedestrian.

An article of manufacture including a non-transitory computer-readable medium having stored thereon program instructions that, if executed by a processor in a radio system, cause the radio system to perform operations comprising transmitting a discovery radio signal, where the discovery radio signal will cause nearby devices to transmit a response radio signal. Additionally, the discovery radio signal may be transmitted on more than one channel of a radio spectrum associate with the radio signal at the same time. The method also includes receiving a response radio signal and analyzing the response radio signal to determine if the radio signal is associated with a pedestrian. Based on the received radio signal being associated with a pedestrian, the method may alter the control of the apparatus by a control system based on the presence of the pedestrian.

An apparatus disclosed herein includes a means for sensing. The means for sensing unit may be configured with a means for transmitting a device-discovery radio signal. The device-discovery radio signal may include a request for any nearby device to transmit a responsive radio signal. The device-discovery radio signal may be transmitted by the means for transmitting on more than one channel of a radio spectrum associate with the radio signal at the same time. The means for sensing may be further configured with a means for receiving, in response to the device-discovery radio signal, a responsive radio signal. The apparatus may also include a means for processing. The means for processing may be configured to analyze the responsive radio signal to determine that the responsive radio signal is associated with a pedestrian. The means for processing may be further configured to alter the control of the apparatus based on the presence of the pedestrian based on the received radio signal being associated with a pedestrian.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
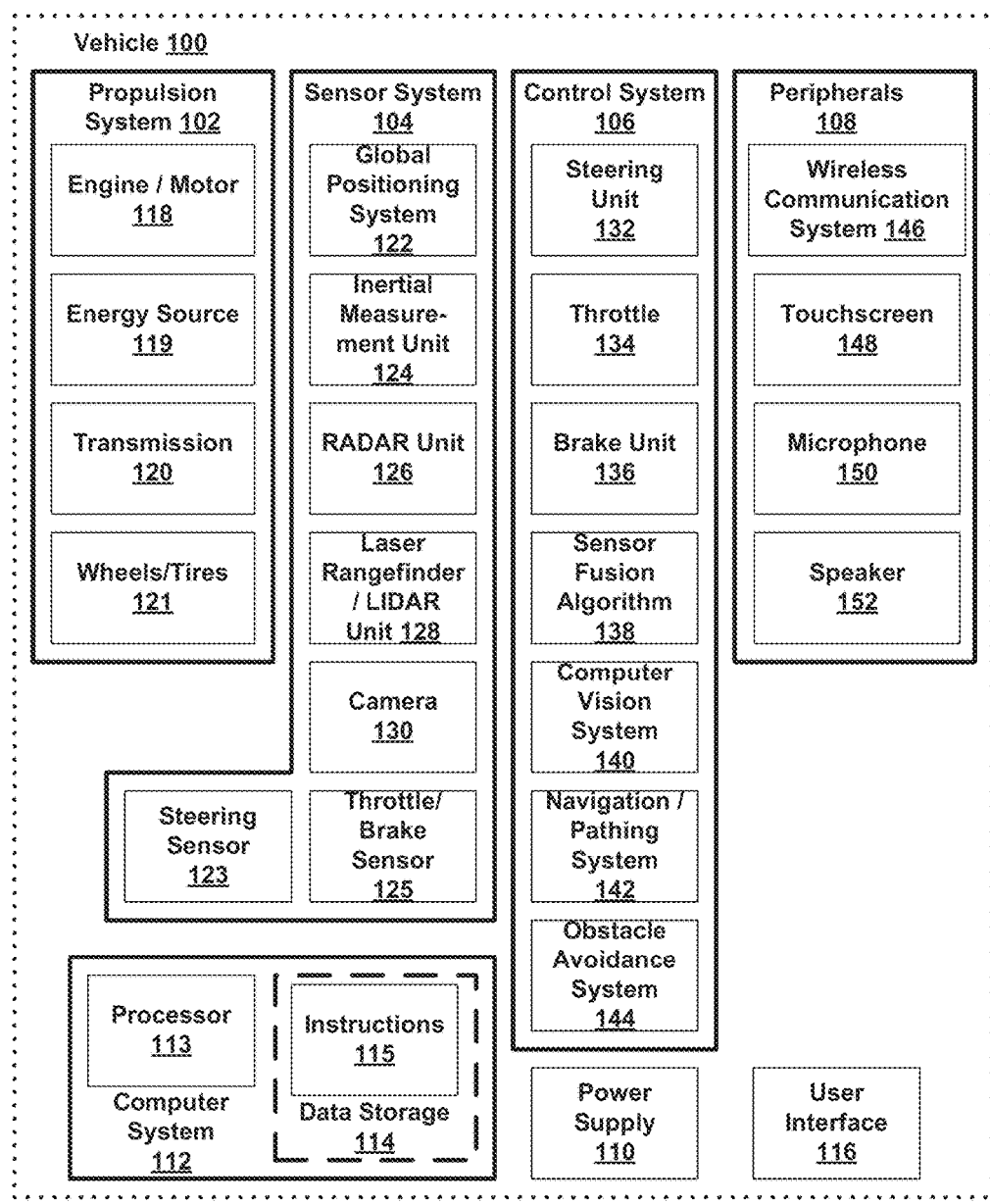
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments disclosed herein relate to a radio system to detect pedestrians within the vicinity of an autonomous vehicle. Further, the embodiments disclosed herein may also be used to identify the location of pedestrians based on the received radio signals.

The radio system of the autonomous vehicle may feature a plurality of antennas. Each antenna may be configured to (i) transmit electromagnetic signals, (ii) receive electromagnetic signals, or (iii) both transmit and receive electromagnetic signals. The antennas may form an array of antenna elements. In some examples, the array may be able to steer a beam formed by the transmitted electromagnetic signals. Additionally, the array may aid in detecting the angle and range from which electromagnetic signals are received.

In some examples, the present radio system transmits an electromagnetic signal to nearby devices requesting the device respond. The radio system also receives responses to the electromagnetic signal from the nearby devices. Based on the radio technology used, the signaling of the transmitted electromagnetic signal may be varied. For example, the transmitted electromagnetic signal may be a Bluetooth, 802.11, or other radio signal. A device that received the signal from the radio unit may transmit a response signal with the same radio technology. However, in some instances, the radio technology used for communication may operate on several radio (e.g., frequency) channels. Both the transmitter and receiver must operate on the same channel at the same time in order to communicate. Thus, it may be desirable to transmit the electromagnetic signal on more than one channel at the same time, in order to increase the chances that a nearby device responds.

Some conventional radio systems, such as Bluetooth, establish a communication by following a pattern of searching for devices to pair (e.g., synchronize) with on available radio channels. Conventionally, a first device known as a master will send a request on a first channel and if it does not get a response from a slave device, the master device will increase the channel and repeat the process. A slave device will typically listen on a first channel for a request, if it does not hear one, it may decrease the channel and repeat the process. Thus, at some point in time, both devices will be operating on the same channel and the slave will transmit a response when it receives the request. However, there may be a period of time where both devices are within range of each other, but not operating on the same frequency. Thus, they cannot communicate with each other (and therefore cannot detect each other) until both devices are operating on the same frequency channel. In other embodiments, the channels may be adjusted in a different way (e.g., the slave may increase channels and the master may decrease channels, or any other method may be used).

In order to reduce the amount of time it takes to discover devices, the radio system of the autonomous vehicle may simultaneously transmit the same electromagnetic signal on multiple channels, to request that nearby devices respond. In one example, the radio technology may be Bluetooth, and Bluetooth may have 79 different channels. As such, the radio system of the vehicle may send a request on all or a portion of the 79 radio channels in order to request a response from any nearby device that receives the request. The radio system may therefore receive responses from devices within the range of the radio signal. By transmitting the request on more than one channel at a time, the amount of time needed to find a wireless device associated with a pedestrian may be reduced. In some embodiments, the radio system of the autonomous vehicle may transmit the electromagnetic signal on multiple channels without waiting for a response signal. In these embodiments, the radio signal may not be transmitted at exactly the same time, but the radio system is still transmitting on more than one channel without waiting for a response signal before transmitting on a second channel.

In some embodiments, the radio system may be configured with multiple antennas. By having multiple antennas, the radio system may have more control over the radio signals. For example, the radio system may be able to adjust the beam-width and/or the direction of a transmitted signal. Having more control over the radio signal allows the radio system to more accurately locate wireless devices (and the associated pedestrian). In one embodiment, a plurality of antennas may be arranged in an array. Such an array may be a linear array, a two-dimensional array, a three-dimensional array, a conformal array, or another array configuration.

Further, in some examples, the radio system on the car can also use an array of whip antennas, giving the radio system more range than usual and may allow the processing layer to measure the direction of arrival of the signal. In still other examples, different antenna technologies may be used to increase the range of detection and/or increase the ability to locate pedestrians. Further, in some examples, the antenna for transmission may be different from the antenna used for reception of radio signals.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a discovery radio signal, receive response radio signals with at least one antenna in the radio system, analyze the response radio signal to determine if the radio signal is associated with a pedestrian, and based on the received radio signal being associated with a pedestrian, altering the control of the vehicle by a control system based on the presence of the pedestrian. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the signals received by the sensor system 104 (e.g., the radio unit). For example, the computer system 112 could calculate the direction (e.g. angle) and distance (e.g. range) to one or more devices transmitting a response signal. The distance may correspond to a time delay and/or a power level of the received radio signal. Additionally, the radio system may be configured to determine whether each device transmitting a response signal is a pedestrian or not. Based on the determination of pedestrian or not, the processor may adjust the control system of the autonomous vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
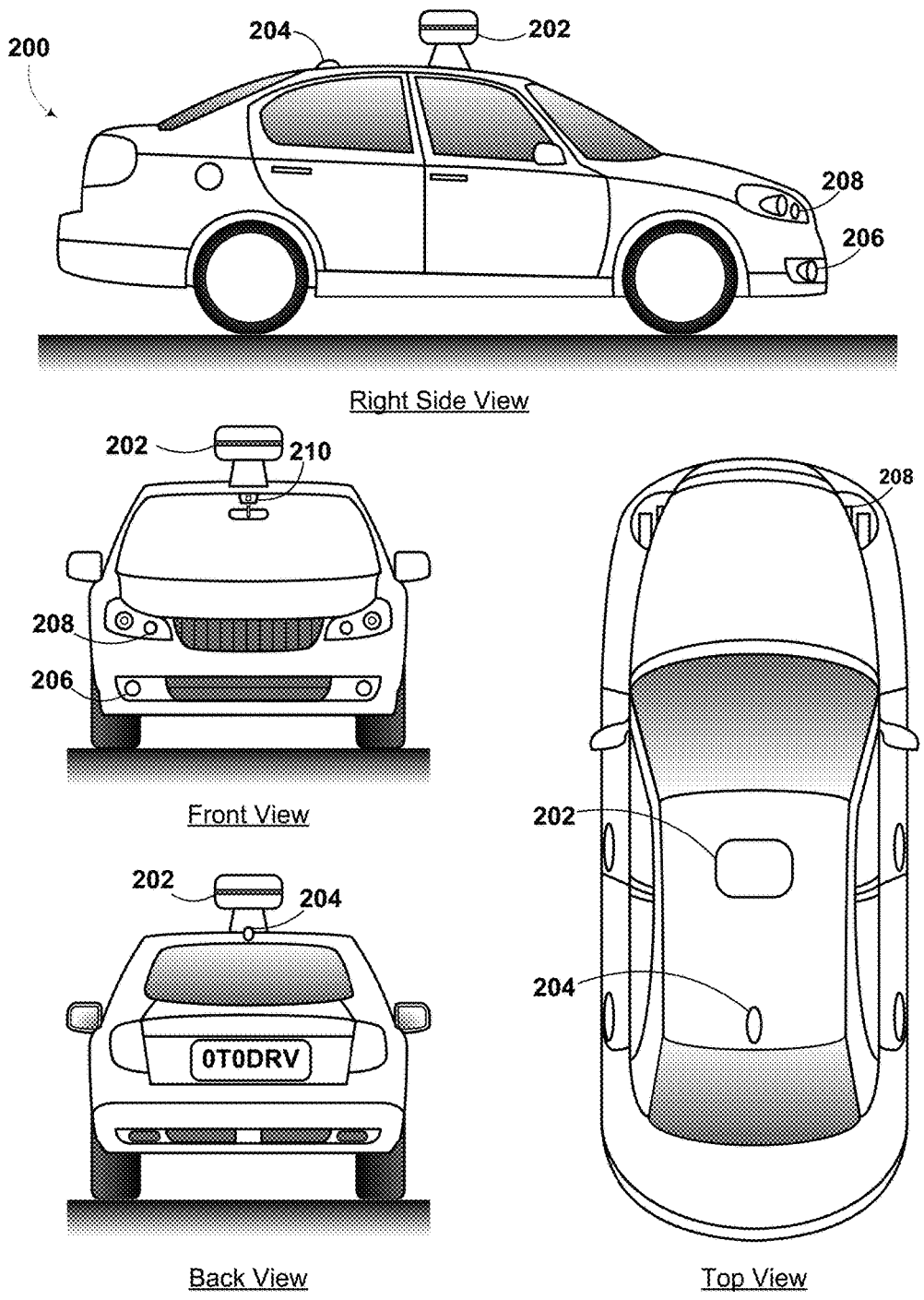
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3:
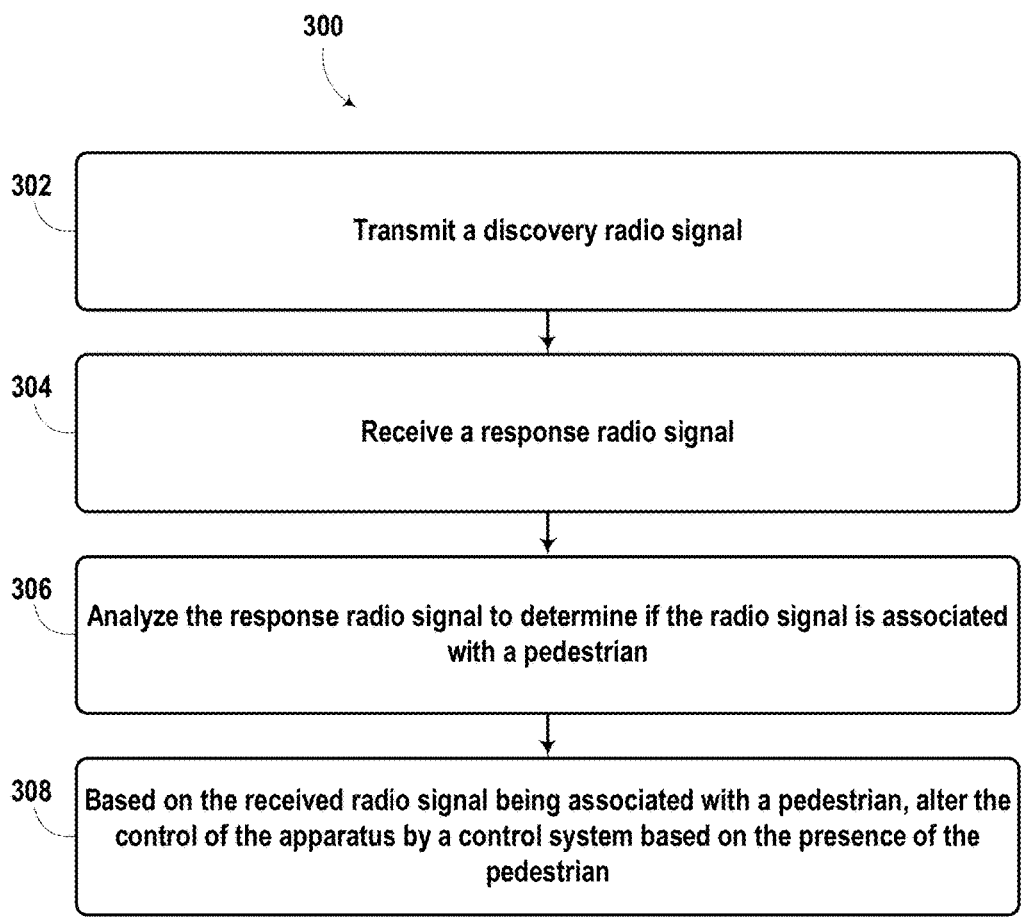
FIG. 3 shows a method, according to an example embodiment.

A method 300 is provided for operating a radio system of an autonomous vehicle to aid in the discovery and identification of pedestrians. The method could be performed using any of the apparatus shown in FIGS. 1-2 and FIGS. 4-5 and described herein; however, other configurations could be used as well. FIG. 3 illustrates the blocks in an example method. However, it is understood that in other embodiments, the blocks may appear in different order and blocks could be added, subtracted, or modified. Additionally, the blocks may be performed in a linear manner (as shown) or may be performed in a parallel manner (not shown).

Block 302 includes the vehicle transmitting a first electromagnetic radiation signal from a radio unit. The electromagnetic signal may take the form of a Bluetooth signal, 802.11 signal, and/or other radio technology signal. The vehicle described in this method could be the vehicle 100 and/or vehicle 200 as illustrated and described in reference to FIGS. 1 and 2, respectively. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle.

For example, at block 302, the vehicle may transmit a signal based on a radio technology such as Bluetooth or 802.11. As previously discussed, in some instances, the radio technology used for communication may operate on several radio (e.g., frequency) channels. Both the transmitter (e.g., the vehicle's radio unit) and receiver (e.g., a mobile device) must operate on the same channel at the same time in order to communicate. Thus, at block 302 it may be desirable for the vehicle's radio unit to transmit the electromagnetic signal on more than one channel at the same time, in order to increase the chances that a nearby device responds.

A traditional Bluetooth radio establishes a communication link by following a pattern of searching for devices to pair (e.g., synchronize) with on available radio channels. Conventionally, a first device known as a master (here, the vehicle) will send a request on a first channel and if it does not get a response from a slave device (here, a mobile device), increase the channel and repeat the process. The slave device will typically listen on a first channel for a request, if it does not hear one, it may decrease the channel and repeat the process. Thus, at some point in time, both devices will be operating on the same channel and the slave will transmit a response when it receives the request. However, there may be a period of time where both devices are within range of each other, but not operating on the same frequency. Thus, they cannot communicate with each other (and therefore cannot detect each other) until both devices are operating on the same frequency channel.

In order to reduce the amount of time it takes to discover devices, at Block 302 the radio system of the autonomous vehicle may use an improved method of searching for devices near the radio unit of the vehicle. The radio system of the vehicle may simultaneously transmit an electromagnetic signal to nearby devices requesting the device respond on more than one channel associated with the radio technology.

In one example, the radio technology may be Bluetooth having 79 different channels. The radio system of the vehicle may send a request on all or a portion of the 79 radio channels requesting the device respond. The radio system may receive responses from devices within the range of the radio signal. By transmitting the request to have devices respond on more than one channel at a time, the about of time needed to find a wireless device associated with a pedestrian may be reduced.

In some embodiments, the radio system of the autonomous vehicle may transmit the electromagnetic signal on multiple channels without waiting for a response signal. In these embodiments, the radio signal may not be transmitted at exactly the same time, but the radio system is still transmitting on more than one channel without waiting for a response signal before transmitting on a second channel. Each transmission may be transmitted a slightly different time than transmissions on other channels (e.g., transmissions are performed at the same time), although they may not be synchronized to all occur at the same instant.

Figure 4A:
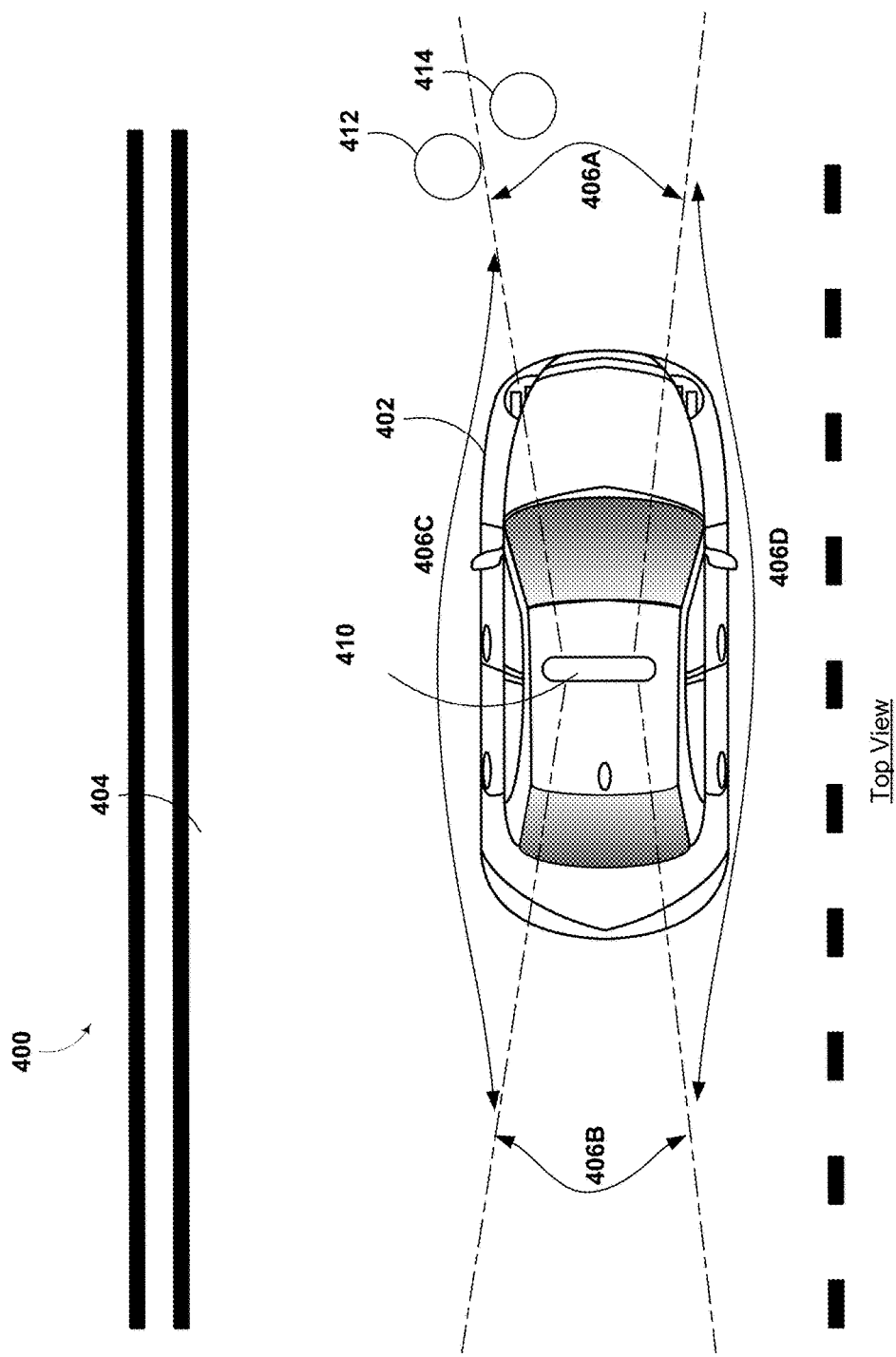
FIG. 4A is a top view of an autonomous vehicle operating scenario, according to an example embodiment.
Figure 4B:
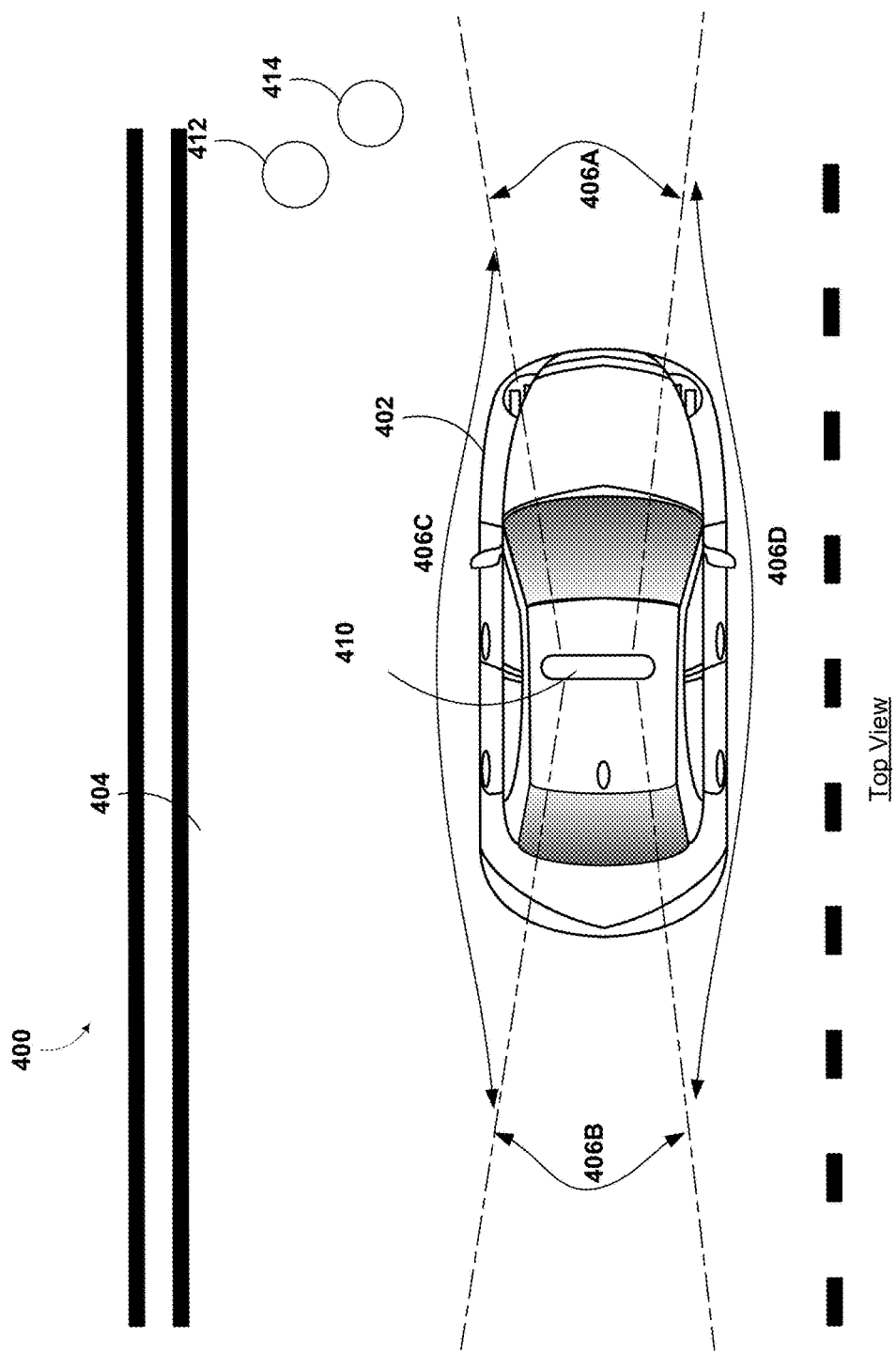
FIG. 4B is a top view of an autonomous vehicle operating scenario, according to an example embodiment.
Figure 4C:
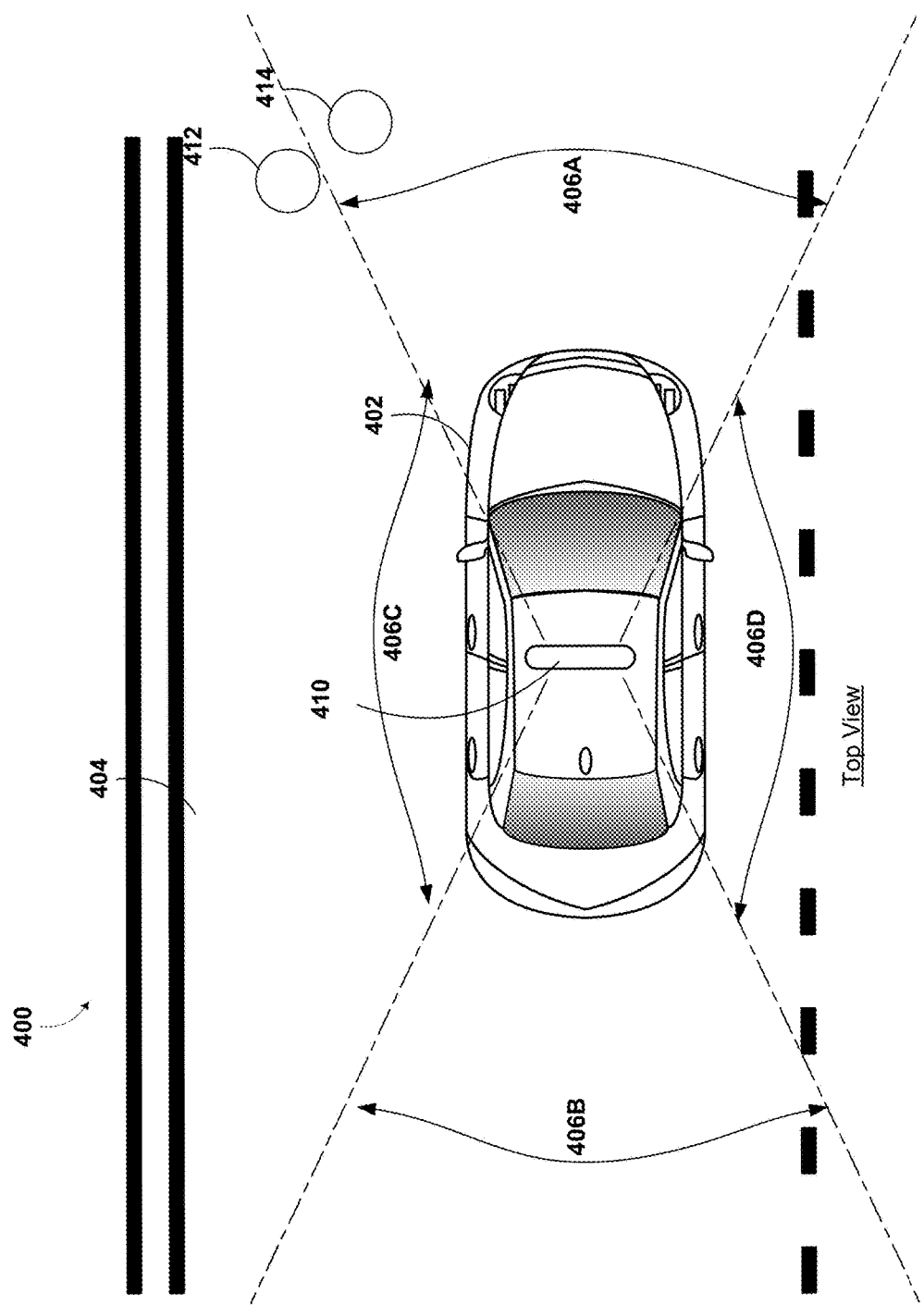
FIG. 4C is a top view of an autonomous vehicle operating scenario, according to an example embodiment.

In some embodiments, the radio system of the vehicle may be configured with multiple antennas. By having multiple antennas, the radio system may have more control over the radio signals. In some embodiments, each antenna may be arranged in a specific direction and each antenna primarily sends and receives signals in the specific direction. In other embodiments, the antennas may form an array. When formed in an array, the radio system may be able to adjust the beam-width and/or direction of a transmitted signal. The beam-width may be narrowed to increase the transmission range or in may be widened to provide a wider transmission width. The antenna beam-widths are discussed further with respect to the various scenarios shown in FIGS. 4A-4C. For example, FIG. 4A shows the antenna system having a first beam-width and FIG. 4C shows the antenna system having a second wider beam-width. Additionally, the array may be a linear array, a two dimensional array, three dimensional array, conformal array, or other array configuration.

Further, in some examples, the radio system on the car can also use an array of whip antennas, giving the radio system more range than if the radio system used typical antennas. In still other examples, different antenna technologies may be used to increase the range of detection and/or increase the ability to locate pedestrians. In some examples, the antenna for transmission may be different from the antenna used for reception of radio signals.

Block 304 includes the vehicle receive response radio signals at a radio unit of the autonomous vehicle with the radio unit. Receiving the response electromagnetic radiation signal could include receiving radio signals that are communicated from mobile devices located on pedestrians. Devices that receive the signal may responsively send a communication back to the vehicle.

Additionally, the type and positioning of the antennas in the radio unit of vehicle may aid in the detection of pedestrians. Having the antennas formed in an array may allow the vehicle to use digital signal processing to perform direction of arrival analysis of the received signals. An array formation may also allow the radio unit to adjust the beam-width and/or direction to focus to look for a signal to receive. The beam-width may be narrowed to increase the detection range or in may be widened to provide a wider detection range. However, there may also be embodiments where the antennas do not form an array. In these embodiments, antennas may be selected based on directionality, polarization, or other criteria. In one example, FIG. 4A shows the antenna system having a first beam-width and FIG. 4C shows the antenna system having a second wider beam-width. The beam width may be adjusted from that of FIG. 4A to that of FIG. 4C based on the location of pedestrians, such as that shown in FIG. 4B.

Block 306 includes the vehicle analyzing the response radio signal to determine if the radio signal is associated with a pedestrian. A processor in the vehicle may be configured to calculate some parameters of objects that transmit a response signal back to the radio system. For example, in one embodiment, the processor is configured to calculate the distance and/or angle to various objects that transmit a response signal back to the radio system. The distance may correspond to a time delay and/or a power level of the received radio signal. Additionally, the radio system may be configured to determine whether each device transmitting a response signal is a pedestrian or not.

Further, the vehicle may make the determination of whether the received signal is associated with a pedestrian based on a variety of criteria. First, in some examples, the mobile device may communicate data identifying the mobile device. For example, the data may include a Bluetooth identification of the model of the mobile device. Further, a mobile device such as a phone, which is typically on a person, may be indicative of a pedestrian.

The device may also send some information about itself along with its response. For example, in some embodiments the device may identify itself as a cellular phone. Therefore, the vehicle may be able to identify the type of device that is sending a response. This may enable to vehicle to determine if a pedestrian may carry the device. In another example, if the response includes data indicating that it is a car (e.g., the Bluetooth identifier is associated with a car manufacturer), then the vehicle can determine is it not associated with a pedestrian.

In another example, the vehicle may use other sensors, in combination with the radio unit, to identify pedestrians. For example, an optical sensor, such as a video camera may be able to image the area around the vehicle. The optical sensor may also be able to identify pedestrians located near the vehicle. However, in some situations the optical sensor may not have a high confidence that it has identified a pedestrian. The vehicle may combine information from the optical sensors and a received signal from the radio unit to confirm that an identified object is a pedestrian. The radio unit may receive a signal indicating that there is one pedestrian directly in front of the vehicle. The optical sensor may identify a single object in front of the vehicle, but it may not be able to determine what the object is. A processing unit in the vehicle may be able to determine that the object is pedestrian through using the information from the received radio signal.

The vehicle may also use stored map information to determine if the received signal is from a mobile device associated with a pedestrian. The vehicle may be able to determine that the mobile device would be associated with a pedestrian, as a mobile device, such a cellular phone, typically would not be present near a roadway except when located on a pedestrian. Additionally, if an angle and distance to a device are known, the vehicle may be able to compare these parameters to known map information. By comparing the parameters to the stored map information, the vehicle may be able to determine if it is possible for a pedestrian to be located in the position indicated by the angle and distance. Further, the angle and distance may also be used with Block 308, when a control of the vehicle is adjusted.

In some embodiments, the mobile device may be configured to communicate motion information along with the response signal. In this embodiment, the vehicle may transmit a signal to request motion data from responsive devices. The mobile device may include information measured by an inertial measurement unit (IMU) of the mobile device. For example, an IMU of a mobile may contain an accelerometer and/or a gyroscope that enable the mobile to accurately measure its movement. The movement may be measured in terms of a position, velocity, etc. In other embodiments, the mobile may be able to measure movement information without the use of an IMU (e.g., movement information may come from a cellular-location service). The mobile may communicate some or all of the movement information from the IMU to the vehicle. The vehicle may use the movement information to determine if the mobile is associated with a pedestrian.

Block 308 includes based on the received radio signal being associated with a pedestrian, altering the control of the vehicle by a control system based on the presence of the pedestrian. The autonomous vehicle is configured to control some or all of the driving aspects of vehicle operation with a vehicle control system. When operating autonomously, at least one computing device located onboard and/or in a server network could be operable to carry out functions such as planning a driving route, sensing aspects of the vehicle, sensing the environment of the vehicle, and controlling drive components such as steering, throttle, and brake. Altering the control of the vehicle may include performing a modified driving behavior.

When the vehicle determines that a pedestrian is located near the vehicle, it may adjust the control of the vehicle based on the presence of the pedestrian. In an example, a computing device may be configured to control actuators of the first vehicle using an action set or rule set associated with the modified control strategy. For instance, the computing device may be configured to adjust translational velocity, or rotational velocity, or both, of the vehicle based on the modified driving behavior. In additional examples, the computing device may alter a course of the vehicle or alter a speed of the vehicle. The computing device may calculate vehicle control signals based on the detected pedestrians.

Example methods, such as method 300 of FIG. 3, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

In some additional embodiments mobile devices may be configured with a safety or protection mode. In this mode, the mobile may either continuously or intermittently attempt to communicate signals to nearby devices indicating the presence of a pedestrian. For example, a person may bike or run while in possession of his or her mobile phone. When the safety or protection mode is enabled, the mobile will attempt to indicate the presence of the pedestrian to various device located near the pedestrian. The safety or protection mode may operate on a mobile device in conjunction with a method, such as method 300, operating on an autonomous vehicle.

FIG. 4A illustrates a scenario 400 involving a vehicle 402 traveling down a roadway 404. Vehicle 402 could be operating in an autonomous mode. Further, the vehicle 402 may be configured with a sensor unit 410. In one example, the sensor unit 410 may have four associated beam-widths 406A-406D. Each beam-width may correspond to an antenna located in the sensor unit 410. Additionally, the each beam-width may correspond to a region over which the respective antenna can transmit and/or receive radio signals. In other examples, the beam-width may be based on an array of antennas within the sensor unit 410. Further, the beam-width(s) may have different shapes or regions than those shown in FIG. 3A. FIG. 3A is one example of possible beam-widths for the sensor unit 410. In still further embodiments, the vehicle 302 may have more than four beam-widths.

In one example embodiment, there may be two pedestrians 412 and 414 in front of the vehicle 402, each of who are carrying a mobile device having a wireless technology. A first pedestrian 412 and a second pedestrian 414 may be within the beam-widths 406C and 406A of the sensor unit 410, respectively. As shown in FIG. 3A, pedestrians 412 and 414 may be crossing in a crosswalk in front of vehicle 402. As shown in FIG. 3A, both pedestrians 412 and 414 are carrying a mobile device having a wireless technology. The autonomous vehicle may recognize the presence of the pedestrians based on signals communicated by the mobile device possessed by each pedestrian.

Because a pedestrian 412 is primarily within the beam-width 406C, the vehicle 402 may be able to determine that a pedestrian 412 is located to the side of the vehicle 402. Additionally, because a pedestrian 414 is primarily within the beam-width 406A, the vehicle 402 may be able to determine that a pedestrian 414 is located in the front of the vehicle 402.

As shown in FIG. 3B, the two pedestrians 412 and 414 are no longer located in front of the vehicle 402. Because the two pedestrians 412 and 414 are primarily within the beam-width 406C, the vehicle 402 may be able to determine that the two pedestrians 412 and 414 are located in to the side of the vehicle 402.

In some embodiments, the vehicle 402 may be able to adjust beam-widths 406A-406D like what is shown in FIG. 3C. As compared to FIG. 3B, the vehicle may be able to more precisely locate pedestrian 414 when adjusting the beam-width. As the beam-width is adjusted, the pedestrian 414 goes from being located within beam-width 406C to being located within beam-width 406A. Therefore, the vehicle will be able to interpret the location of pedestrian 414 as being near where the adjusted beam-width 406A is located.

In some embodiments, the beam-widths 406A-406D may be adjusted in a way that the various beam-widths 406A-406D overlap with each other (not shown). For example, if beam-width 406A and beam-width 406D had an overlap, receivers associated with both beam-widths may receive a signal communicated by a mobile device held by pedestrian within the overlap region. Thus, the location of the mobile devices, and therefore the pedestrian, would likely be within the overlap region. Further, the sensor unit 410 may be able to steer (and/or widen or narrow) the radio beam-widths so the beam-width 406 to more precisely locate mobile devices located on pedestrians.

Additionally, because the vehicle 402 received signals from mobile devices, for each mobile device that the vehicle 402 receives a signal, a computer located within vehicle 402 may determine if each received signal is from a mobile device (and thus, a pedestrian). Further, the vehicle 402 may make the determination of whether the received signal is associated with a pedestrian based on a variety of criteria. First, in some examples, the mobile device may intentionally communicate data identifying the mobile device. For example, the data may include a Bluetooth identification of the model of the mobile device. The vehicle may be able to determine that the mobile device would be associated with a pedestrian, as a mobile device, such a cellular phone, typically would not be present near a roadway except when located on a pedestrian. In another example, the vehicle 402 may use other sensors, in combination with the radio unit, to identify pedestrians. For example, an optical sensor, such as a video camera may be able to image the area around the vehicle 402. The optical sensor may also be able to identify pedestrians located near the vehicle 402. However, in some situations the optical sensor may not have a high confidence that it has identified a pedestrian. The vehicle 402 may combine information from the optical sensors and a received signal from the radio unit to confirm that an identified object is a pedestrian. The radio unit may receive a signal indicating that there is one pedestrian directly in front of the vehicle 402. The optical sensor may identify a single object in front of the vehicle 402, but it may not be able to determine what the object is. A processing unit in the vehicle 402 may be able to determine that the object is pedestrian through using the information from the received radio signal.

It will be understood that there are other similar methods that could describe receiving data representative of an electromagnetic signal, receiving an indication of a movement of the vehicle, determining a movement parameter based the indication of the movement of the vehicle, and recovering the distance and direction information from the electromagnetic signal, based on the movement parameter. Those similar methods are implicitly contemplated herein.

Figure 5:
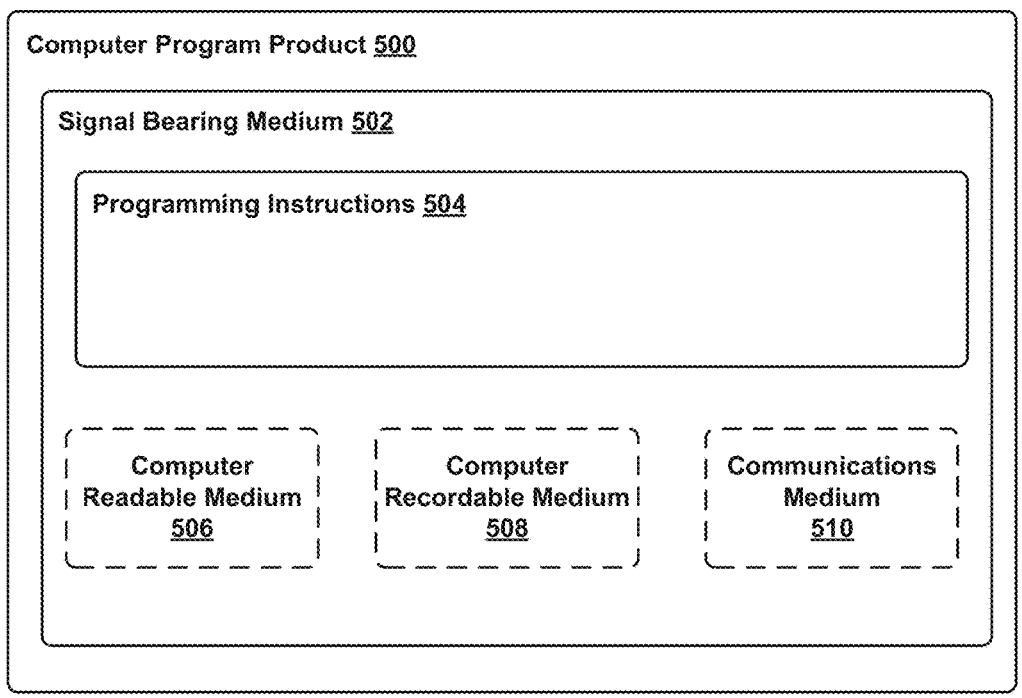
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:
1. An apparatus comprising:
a first sensor unit configured to:

transmit, using a single short-range wireless transmission radio technology, a device-discovery radio signal on all frequency channels of the single short-range wireless transmission radio technology, wherein the device-discovery radio signal is transmitted without waiting for a response signal, and wherein the device-discovery radio signal comprises a request for any nearby device to transmit a responsive radio signal, and receive, using the single short-range wireless transmission radio technology and in response to the device-discovery radio signal, the responsive radio signal on at least one of the frequency channels;

a second sensor unit configured to receive optical data indicating an object near a vehicle; and a processor configured to:

analyze the optical data to determine an identification of the object;

in response to not having a high confidence as to the identification of the object, analyze the received responsive radio signal to determine whether the received responsive radio signal was received from a cellphone of a pedestrian;

based on determining that the received responsive radio signal was received from the cell phone of the pedestrian, confirm the identification of the object; and alter a control of the apparatus based on confirming the identification of the object.

2. The apparatus according to claim 1, wherein the processor is further configured to determine a direction of the responsive radio signal.

3. The apparatus according to claim 1, wherein the processor is further configured to determine a distance of the responsive radio signal.

4. The apparatus according to claim 1, wherein altering the control comprises changing the movement of the apparatus.

5. The apparatus according claim 1, wherein altering the control comprises stopping the apparatus.

6. The apparatus according claim 1, wherein altering the control comprises switching the apparatus to a human-controlled mode.

7. A method comprising:

transmitting, using a single short-range wireless transmission radio technology, a device-discovery radio signal all frequency channels of the single short-range wireless transmission radio technology, wherein the device-discovery radio signal is transmitted without waiting for a response signal, and wherein the device-discovery radio signal comprises a request for any nearby devices to transmit a responsive radio signal, receiving, using the single short-range wireless transmission radio technology and in response to the device-discovery radio signal, the responsive radio signal on at least one of the frequency channels;

receiving optical data indicating an object near a vehicle;

analyzing the optical data to determine an identification of the object;

in response to not having a high confidence as to the identification of the object, analyzing the received responsive radio signal to determine whether the received responsive radio signal was received from a cellphone of a pedestrian;

based on determining that the received responsive radio signal was received from the cell phone of the pedestrian, confirming the identification of the object; and altering a control of an apparatus based on confirming the identification of the object.

8. The method of claim 7, further comprising determining a direction of the responsive radio signal.

9. The method of claim 7, further comprising determining a distance of the responsive radio signal.

10. The method of claim 7, wherein altering the control comprises changing the movement of the apparatus.

11. The method of claim 7, wherein altering the control comprises stopping the apparatus.

12. The method of claim 7, wherein altering the control comprises switching the apparatus to a human-controlled mode.

13. An article of manufacture including a non-transitory computer-readable medium having stored thereon program instructions that, if executed by a processor in a radio system, cause the radio system to perform operations comprising:

transmitting, using a single short-range wireless transmission radio technology, a device-discovery radio signal on all frequency channels of the single short-range wireless transmission radio technology, wherein the device-discovery radio signal is transmitted without waiting for a response signal, and wherein the device-discovery radio signal comprises a request for any nearby devices to transmit a responsive radio signal, receiving, using the single short-range wireless transmission radio technology and in response to the device-discovery radio signal, the responsive radio signal on at least one of the frequency channels;

receiving optical data indicating an object near a vehicle;

analyzing the optical data to determine an identification of the object;

in response to not having a high confidence as to the identification of the object, analyzing the received responsive radio signal to determine whether the received responsive radio signal was received from a cellphone of a pedestrian;

based on determining that the received responsive radio signal was received from the cell phone of the pedestrian, confirming the identification of the object; and altering a control of an apparatus based on confirming the identification of the object.

14. The article of manufacture according claim 13, wherein altering the control comprises switching the apparatus to a human-controlled mode.

\* \* \* \* \*